(12) United States Patent
Loise et al.

(10) Patent No.: US 6,600,963 B1
(45) Date of Patent: Jul. 29, 2003

(54) LOW COST MODULAR ARCHITECTURE FOR PILOTING AN AERODYNE OPERATING WITH HIGH LEVEL OF SECURITY

(75) Inventors: Dominique Loise, Velizy-Villacoublay (FR); Jean-Pierre Ledoux, Verrieres-le-Buisson (FR); Patrick Sardier, Meudon (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/380,081

(22) PCT Filed: Feb. 20, 1998

(86) PCT No.: PCT/FR98/00335

§ 371 (c)(1),
(2), (4) Date: Aug. 25, 1999

(87) PCT Pub. No.: WO98/38553

PCT Pub. Date: Sep. 3, 1998

(30) Foreign Application Priority Data

Feb. 25, 1997 (FR) .............................. 97 02210

(51) Int. Cl.[7] .............................................. G05B 23/02
(52) U.S. Cl. ............................ 700/81; 700/21; 700/79; 700/292; 700/298
(58) Field of Search ........................... 700/2, 9, 20, 26, 700/79, 81, 21, 292, 297, 298; 702/118, 182; 701/3, 14, 31, 33; 244/76 R

(56) References Cited

U.S. PATENT DOCUMENTS

| | | | | |
|---|---|---|---|---|
| 4,155,116 A | * | 5/1979 | Tawfik et al. | 364/119 |
| 4,400,694 A | * | 8/1983 | Wong et al. | 340/505 |
| 4,421,716 A | * | 12/1983 | Hench et al. | 376/216 |
| 4,935,863 A | * | 6/1990 | Calvas et al. | 364/138 |

FOREIGN PATENT DOCUMENTS

| | | | | |
|---|---|---|---|---|
| DE | 3732334 A | * | 4/1989 | |
| EP | 0482526 A | * | 4/1992 | |
| EP | 0532045 A | * | 3/1993 | |
| EP | 0652689 A | * | 5/1995 | |
| GB | 2238650 A | * | 6/1991 | |

* cited by examiner

*Primary Examiner*—Paul P. Gordon
(74) *Attorney, Agent, or Firm*—Oblon, Spivak, McClelland, Maier & Neustadt, P.C.

(57) ABSTRACT

A modular architecture for electronic equipment. Data-concentration modules, processing modules and display devices are interconnected by data-transmitters with sensors, measuring instruments and detectors. The data-concentration modules concentrate only the data which is not critical for the industrial process. This data is transmitted to other modules by a multi-receiver serial bus. The other modules directly receive the critical data which is routed by separate, respective serial digital links between, on the one hand, display devices and functions controlling the processes which are distributed in the process modules, and, on the other hand, sensors, measuring instruments and actuators.

32 Claims, 6 Drawing Sheets

LOW COST MODULAR ARCHITECTURE FOR PILOTING AN AERODYNE OPERATING WITH HIGH LEVEL OF SECURITY

BACKGROUND OF THE INVENTION

1. Field of the Invention

The present invention relates to a modular architecture of a set of items of electronic equipment making it possible to control an industrial process which necessitates a high level of operating safety.

2. Discussion of the Background

It applies especially, but not exclusively, to the items of electronic equipment installed on board aircraft which perform various flight control functions. It is clear that current developments in this equipment are aimed more and more at automating the tasks of flight control, and in particular, the piloting of the aircraft. This tendency is leading to equipment which is more and more complex, bulky, energy-consuming, expensive and difficult to maintain.

In order to solve this problem, it has been sought to integrate this equipment and to make it modular. To that end, an architecture has already been proposed which brings together various electronics modules in electronics cabinets or racks, these modules carrying out the acquisition of the information originating from the sensors and the other on-board equipment, as well the deriving of flight control commands.

An attempt has also been made to group together and to share several functionality aspects within the same module, it being possible for the necessary processing and calculations to be carried out by means of a single processor used in timesharing mode.

However, in the equipment installed on board aircraft, a level of criticality is generally associated with each function carried out and each item of data used by the functions, each level of criticality corresponding to a maximum failure rate required by the authorities who certify aeronautical equipment. Thus, the functions of the most critical level correspond to those functions the failure of which may have catastrophic consequences. These functions should therefore exhibit a very low probability of failure (lower than $10^{-9}$ failures per hour of flight). Likewise, the most critical data are the data which, if they are no longer available or erroneous, may give rise to catastrophic events. Obviously, the criticality of the data is not related to the criticality of the functions which use them, the same data item possibly being used by several functions with different levels of criticality.

The sharing of the same processor by several functions implies therefore that functions with different levels of criticality are performed by the same processor, which greatly increases the risk that less critical functions, such as the functions relating to the maintenance of the equipment, disturb or even block the performance of functions which are the most critical, that is to say a malfunctioning of which can lead to a catastrophic situation. It is then necessary to make special provisions so that the functions carried out, and in particular the most critical ones, are performed with the level of safety required by the authorities who certify on-board equipment.

To this end, a redundant architecture has been proposed, in which all the modules, in particular those which perform critical functions, are triplicated so that the critical functions can be carried out even following a breakdown. However, this solution exhibits little interest from the point of view of cost reduction, of the number of modules necessary, of the power consumed and dissipated, of the availability (failure rate) and of the equipment maintenance facilities.

Moreover, the redundant-architecture solution amounts to duplicating not only critical functions, but also noncritical functions, such as the maintenance functions.

SUMMARY OF THE INVENTION

The object of the present invention is to remove these drawbacks. To that end, the invention proposes a modular architecture of items of electronic equipment for the control of an industrial process, comprising, on the one hand, receptacles containing data-concentration modules and processing modules supplied with energy by power supply modules, and, on the other hand, critical display devices, the assembly being interconnected via data transmission means to critical sensors, noncritical sensors and actuators.

According to the invention, this architecture is characterized in that the critical sensors transmit their critical information directly to the critical display devices on the one hand, and to the concentration and processing modules of the receptacles on the other hand, the concentration modules, on the basis of the data from the critical and noncritical sensors, deriving noncritical data intended for the display devices and for the processing modules via a multi-receiver serial digital bus, the processing modules deriving commands intended for the actuators on the basis of the data from the critical sensors and of the noncritical data output by the concentration modules.

The distribution of the critical data to all the elements of the architecture is done using individual buses. The absence of concentration of the critical data on a single bus avoids all the equipment being out of service in the event of a breakdown of a single bus. This architecture thus allows faults to be confined to the affected module alone by preventing them from being propagated. It is therefore no longer necessary to use a completely duplicated or triplicated architecture, with instead only the critical functions being duplicated or triplicated. The invention thus makes it possible to substantially reduce the cost, size and dissipated power of such equipment.

Moreover, as the faults are confined to the affected module alone, the maintenance of the equipment, and in particular faultfinding and repair operations, are greatly facilitated.

Advantageously, the display devices comprise processing means for visually displaying the data which are transmitted to them originating from the sensors, the measuring instruments or other equipment.

In this way, the display devices can directly supply all the information on the control of the process, and particularly the critical information, independently of the availability of the processing modules.

According to one feature of the invention, each processing and data-concentration module comprises an identical processing card, equipped with a processor, and an input/output card providing the connection between the processing card and the inputs and outputs of the module, the processing card comprising a memory into which is loaded the program making it possible to control the processor so as to perform the function of the module.

This arrangement, by a scale effect, makes it possible to greatly reduce the cost of design and manufacture of the modules, and to facilitate their maintenance. This is because when a processing card of a module is faulty, it can thus be replaced directly on the aircraft by another processing card into which the program corresponding to the functions of the module has previously been loaded.

These items of equipment carry out, for example, the functions of automatic piloting of an aircraft, anti-stall protection, data concentration and centralized maintenance.

BRIEF DESCRIPTION OF THE DRAWINGS

An embodiment of the device according to the invention will be described below, by way of non-limiting example, with reference to the attached drawings in which.

DETAILED DESCRIPTION OF THE PREFERRED EMBODIMENTS

Figure 1:
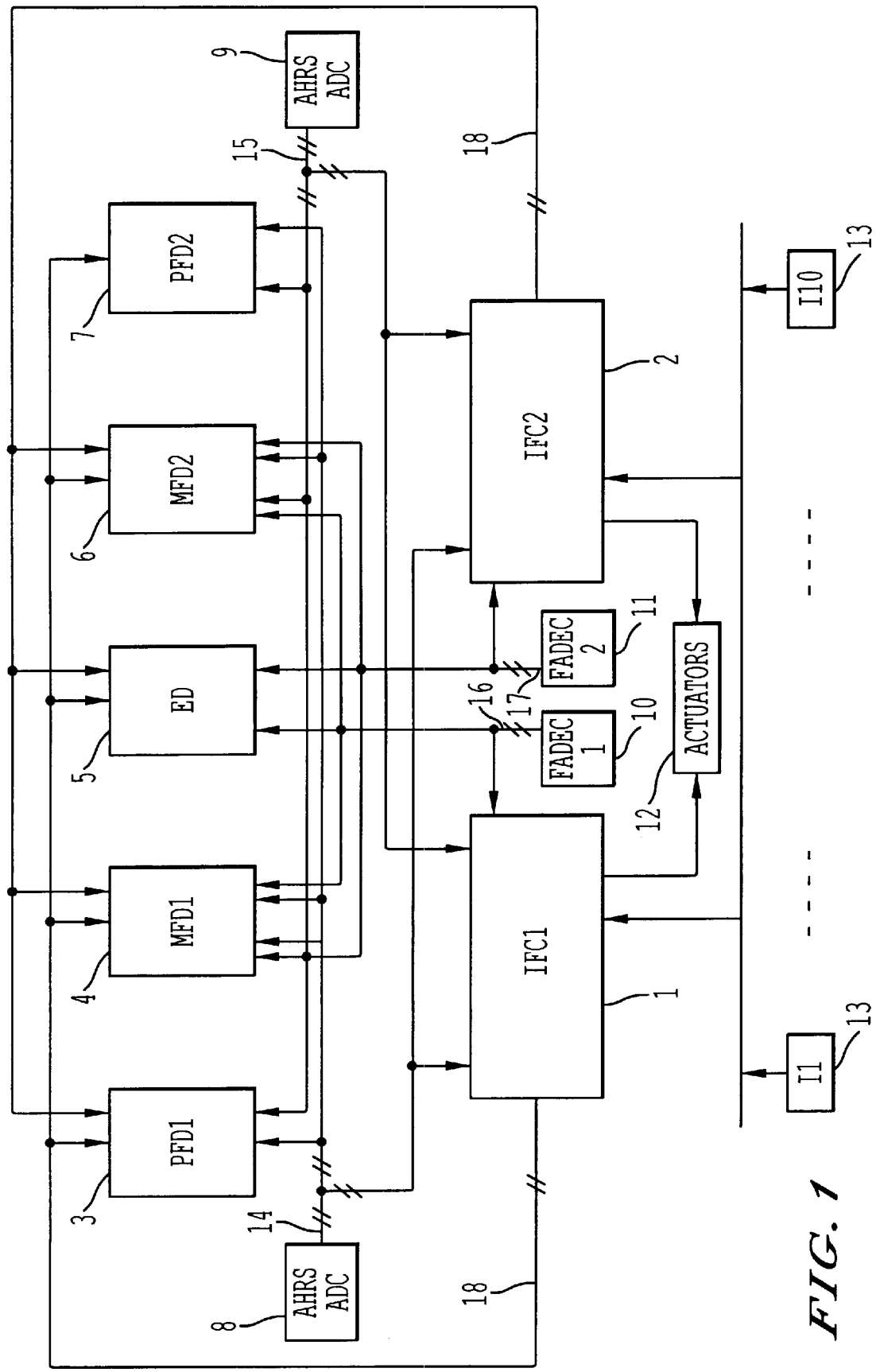
FIG. 1 diagrammatically represents an architecture according to the invention of a set of items of electronic equipment installed on board an aircraft.

The architecture of items of on-board electronic equipment, which is represented in FIG. 1, makes it possible to perform automatic piloting of an aircraft, provide protection against stalling, perform data concentration and centralized maintenance of these items of equipment. To this end, it comprises five critical visual-display devices 3 to 7, two receptacles 1, 2 containing two identical modular processing assemblies IFC1 and IFC2 (Integrated Flight Cabinet), two primary reference systems 8, 9 which are sensors delivering critical data and which each include, for example, an AHRS (Attitude Heading Reference System) attitude unit, an ADC system for acquisition and processing of data relating to the outside air (Air Data Computer), enabling short-term acquisition of flight parameters, two engine-parameter measuring devices FADEC1 and FADEC2 (Full Authority Digital Engine Computer), 10, 11, a set of actuators 12 and a plurality of peripheral equipment items I1 to I10 13, delivering noncritical data such as sensors, measuring, communications and alarm-signalling instruments.

Each of the critical visual-display devices 3 to 7 comprises a visual display screen, a data acquisition interface, means of processing these data and in particular means which derive the symbologies specific to each data item to be displayed. The two screens PFD1 and PFD2 3, 7, are dedicated to displaying flight data, the screen ED to displaying the engine operating parameters, and the two screens MFD1 and MFD2, known as "multi-function" screens, allow other parameters relevant to flight control to be displayed.

The data which are critical for flight safety, such as those output by the primary reference systems 8 and 9, are transmitted directly by specific, individual serial digital links 14, 15, to the critical visual-display devices 3, 4, 6, 7 which display-them, and to the receptacles 1, 2 of the processing assemblies. Likewise, the critical data originating from the engine-parameter measuring devices 10, 11 are transmitted via individual serial links 16, 17 to the critical visual-display devices 4 to 6 and to the receptacles 1, 2 of the processing assemblies.

Moreover, the other noncritical data, exchanged by the receptacles 1, 2 of the processing assemblies and displayed by the visual-display devices 3 to 7 are transmitted in multiplexed form by serial buses 18, 19, of the ARINC 429 type, for example, which distribute the information to the modules, in a redundant way, with a level of safety meeting the requirements, and at a reduced cost by virtue of the use of identical processing components. Moreover, these buses allow a transmitter to address several receivers, the failure of one receiver not preventing reception by the other receivers.

Figure 2:
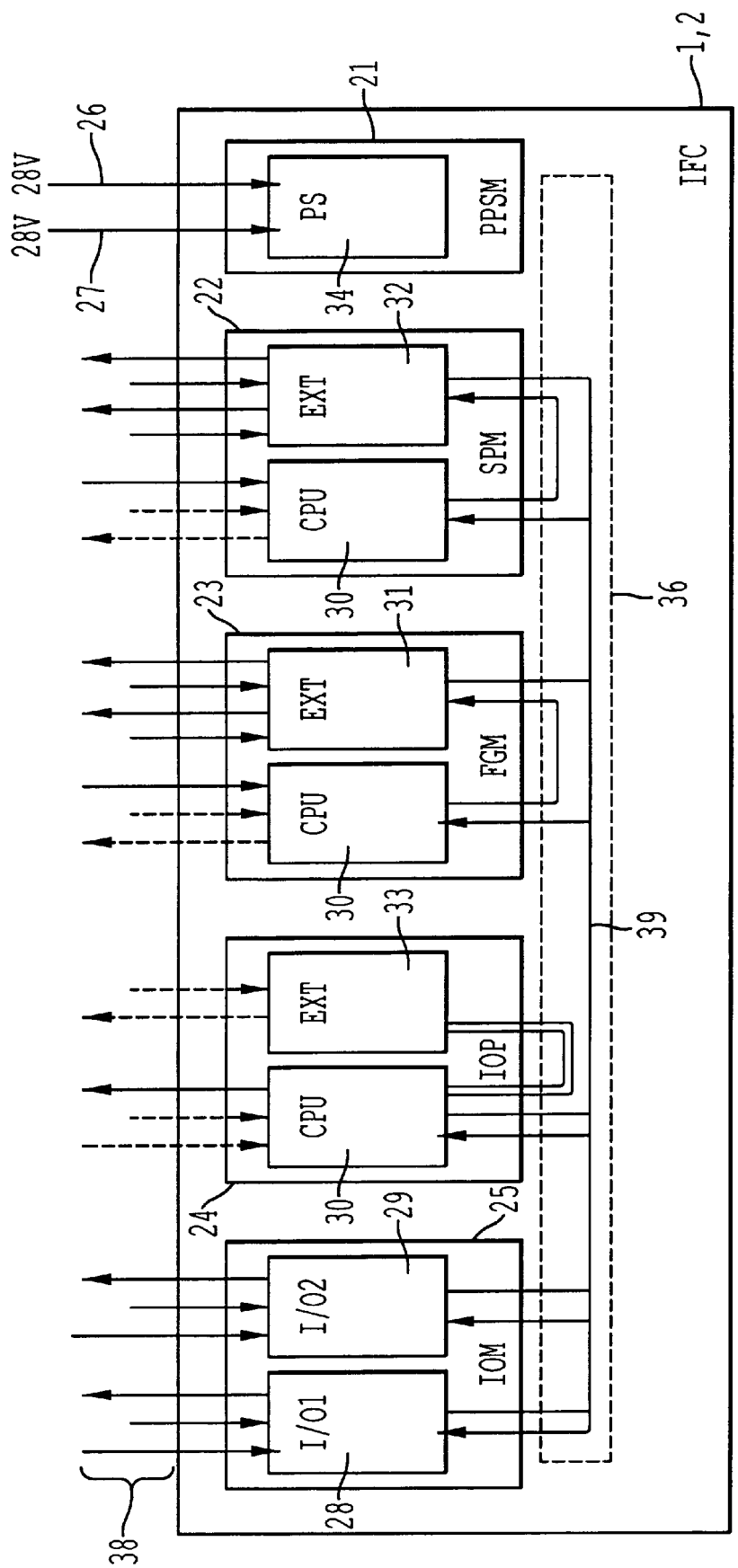
FIG. 2 shows in detail equipment shown in FIG. 1, bringing together several modules.

As represented in FIG. 2, the receptacles 1, 2 of the processing assemblies exhibit the form of electronics racks in which a plurality of modules 21 to 25 are inserted and interconnected. Each processing assembly 1, 2 comprises, a module IOM 25, tasked with managing the inputs and outputs of noncritical discrete and analogue data, a module IOP 24 tasked with concentrating the noncritical digital data, a module FGM 23 tasked with processing the critical data relating to automatic piloting, and a module SPM 22 tasked with performing the function of preventing risks of stalling.

In order to distribute the power supplies at the least cost, each processing assembly 1, 2 comprises a primary power supply module PPSM 21 which groups together the functions of pre-regulation of the primary voltages at 28 volts nominal supplied by two general-purpose direct-current power supply lines 26, 27 of the aircraft, the other modules 22 to 25 including a secondary power supply circuit consisting of low-cost voltage converters, producing power supply voltages matched to their own requirements. In particular, the module 21 performs the functions of limiting overvoltages, clipping of lightning-related transient voltages, and compensation for transient voltage drops, with the aim of delivering a pre-regulated voltage to the other modules 22 to 25. This is because it transpires that the voltages supplied by the general-purpose power supplies of an aircraft are subject to large variations, from 18 to 32 volts, these variations possibly varying transiently from 12 to 48 volts. The primary power supply module PPSM 21 brings together, on a single electronics card 34, a set of relatively bulky and expensive components in order to supply several modules with a pre-regulated voltage exhibiting a small range of variation, for example between 18 and 32 volts, which can then be adapted by inexpensive converters incorporated into each of the modules 22 to 25, and capable of supplying the varied voltages used by them.

The other modules 22 to 24, except for the discrete- and analog-data management module 25, each comprise the same microprocessor card 30 and a special-purpose, but similarly structured, extension card 31 to 33, particularly performing the input and output tasks for the module. The discrete- and analog-data management module 25 also comprises two cards 28, 29, but these are both dedicated to the management of inputs and outputs and do not include a processor.

It should be noted that two identical modules in the two processing assemblies 1, 2 can carry out the same processing in redundancy mode or complementary processing operations, depending on the criticality of the functions carried out. This architecture thus offers many adaptation and configuration options.

Figure 3:
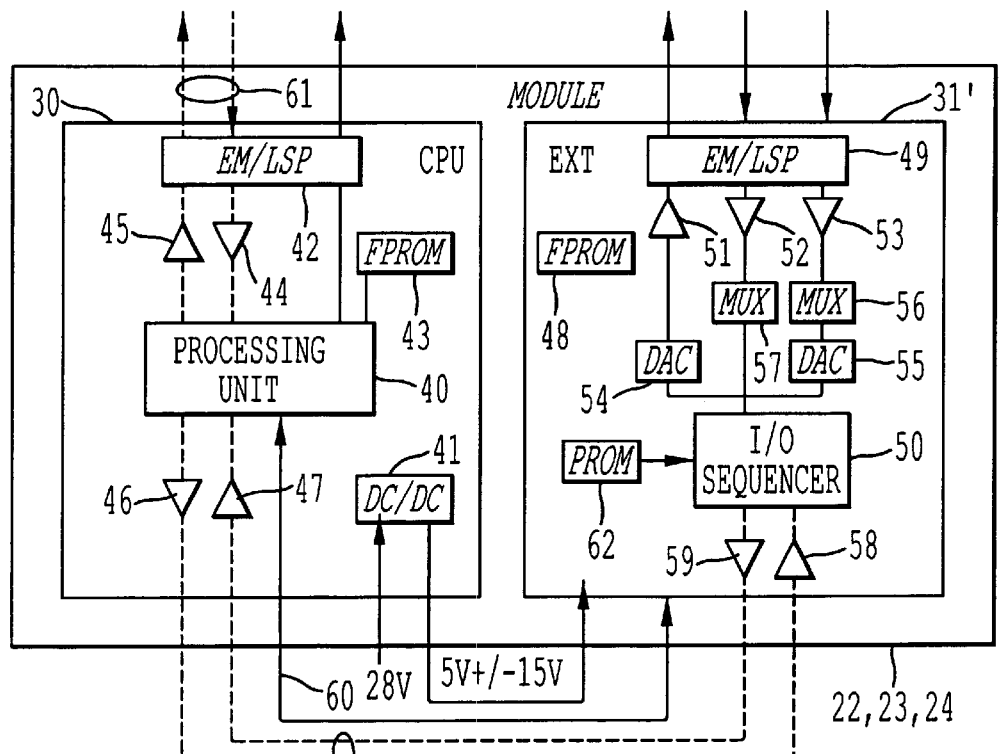
FIG. 3 shows an example of a module according to the invention in more detail.

In FIG. 3, which represents an example of a module 22, 23, 24 equipped with calculating means, the microprocessor card 30 comprises:

- a secondary power supply 41 comprising a DC voltage converter which receives a pre-regulated voltage of 18 to 32 volts, in order to produce the power supply voltages for the various components of the card, as well as of the associated extension card 31',
- a processing unit 40 which communicates via temporary storage and formatting devices 46, 47 with a digital bus 39 internal to the processing assembly 1, 2, for example a "backplane", bus of the ARINC 429 type which provides the link, not only with the other modules of the processing assembly, but also with the associated extension card 31', and
- a non-volatile maintenance memory 43, of the FPROM or the EEPROM type, for example, in which are stored in real time all the data necessary for maintenance, in particular the results of self-tests and the data making it possible to locate any faults and to establish their cause.

This processing card 30 also brings together all the input/output interfaces which all the processing modules need in order to communicate directly with the environment outside the processing assemblies 1, 2. Hence it comprises an external digital link 61, for example of the ARINC 429 type, linked to the processing unit 40 via a circuit 42 for protection against electromagnetic radiation and against lightning, and temporary storage and formatting devices 44, 45.

Moreover, the processing unit 40 is linked to the extension card 31' by a serial line 60 making it possible to exchange discrete data, known as ancillary operating data, with the latter.

Each extension card 31' comprises a programmable automatic sequencer 50, consisting for example of an ASIC circuit, which is associated with a non-volatile memory 62, for example of the PROM type, containing consecutive and linear sequences of instructions. This automatic unit, according to the instructions received for example from the serial line 60, manages the loading of its associated memory and the running of the various tasks which are allocated to it (for example, analog data acquisitions, audio signal generation, etc) and which cannot be carried out by the generic interfaces of the processing module card 30.

To this end, the automatic unit 50 is linked to the "backplane" digital bus 39 by means of temporary storage and formatting devices 58, 59, this, in particular, allowing it to communicate with the processing unit 40. It is also linked directly to the environment outside the processing unit 1, 2 for example by means of a circuit 49 for protection against lightning and electromagnetic radiation, in order to receive discrete data via a specific interface and matching circuit 52 and a multiplexer 57, and analog data by virtue of a specific interface and matching circuit 53, a multiplexer 56 and an analog/digital converter 55, and to send analog data via a digital/analog converter 54 and a specific interface and matching circuit 51.

Each extension card 31' may also comprise a non-volatile maintenance memory, provided for the same purpose as the memory 43 of the processing card 30. This maintenance memory can be managed by the processing card of the module, or else by other means provided directly on the extension card 30'.

The cards 28 and 29 of the discrete and analog input and output management module 25 are constructed according to a layout similar to that of the card 31' which has just been described. In particular, these cards comprise the ASIC circuit 50. However, one of these two cards 28, 29 further comprises a secondary power supply of the same type as the power supply circuit 41, which provides the power supply to the two cards 28, 29 of the module 25. At least one of these two cards comprises a non-volatile maintenance memory.

From the hardware point of view, this architecture presents the advantage of using a reduced number of basic cards of the same structure, namely processing cards 30, and extension cards and 31 to 33 with a structure substantially similar to that of the input/output cards 28, 29. This results in significant economies of scale.

It should be noted that, in the modules 22 to 25 consisting of two cards, the cards are interconnected only by the backplane connector of the rack 1, 2, simply plugging a card into this connector ensuring that the former is fully connected. This arrangement makes it possible to facilitate maintenance operations, and removes the risks of connecting errors when cards are replaced in a module.

Figure 4:
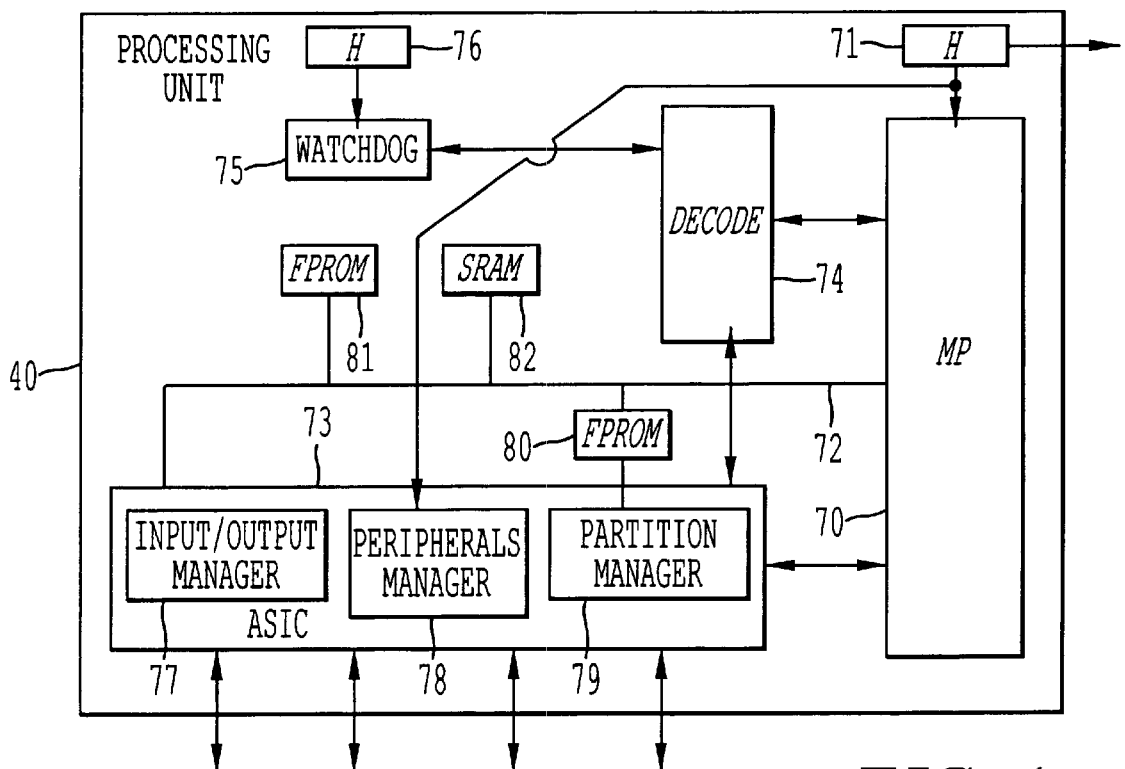
FIG. 4 shows a processing unit of a module according to the invention.

In FIG. 4, the processing unit 40 comprises a microprocessor 70 timed by a clock 71, and the operation of which is monitored by a "watchdog" circuit 75 which timed by another clock 76. The microprocessor 70 is linked via an address and data bus 72 to a program memory of the non-volatile type 81, and to a data memory of volatile type 82, as well as to an ASIC circuit 73. The access addresses supplied by the microprocessor 70 are processed by an address decoder 74 before being sent on the bus 72.

The ASIC circuit 73 comprises means 77 for managing the inputs/outputs of the processing unit 40, which may be of the digital 429 ARINC type, discrete, or serial, and supplies services 78 of high-speed data-transfer between areas addressable by the microprocessor 70, of time counting, and services of monitoring 79 of accesses to the space addressable by the microprocessor 70 depending on the access rights allocated to the various tasks run by it, these access rights being stored in another non-volatile memory 80 addressed via the bus 72 and the data port of which is linked to the ASIC circuit 73.

On the software front, all the cards 30 with an identical microprocessor comprise the same operating software performing the common functions of starting up the microprocessor, the functions of initialization and self-tests of the card, and the functions of real-time management of a multi-task system comprising libraries of common functions used by the applications performed by the processing assembly 1, 2. These arrangements make it possible to achieve substantial gains in terms of development costs and of time scales for producing applications.

Figure 5:
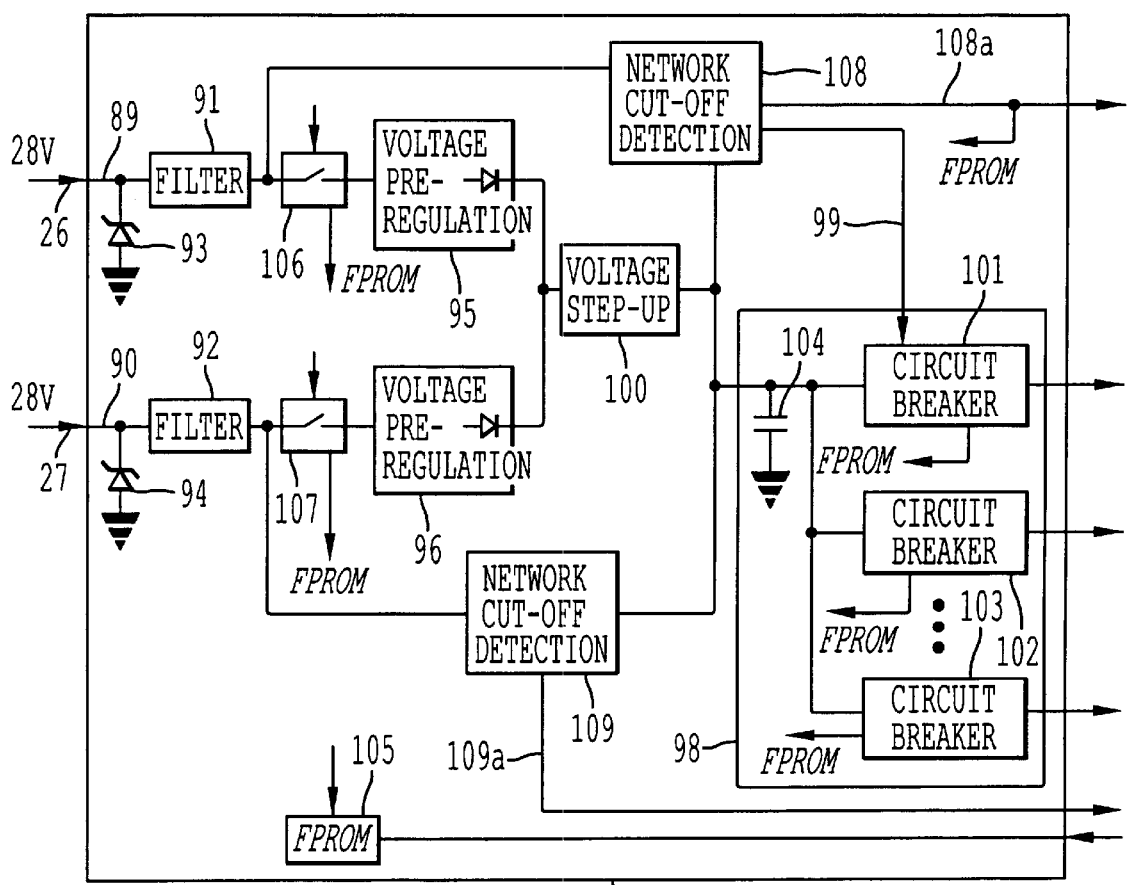
FIG. 5 shows a power supply module according to the invention.

In FIG. 5, the card 34 of a primary power supply module 21 comprises successively, in series, for each 28-volt power supply line 89, 90 of the aircraft, applied at the input:

- a peak-limiting device 93, 94, consisting of a Zener diode and/or a similar device such as a varistor, connected in parallel between the respective power supply line and earth, this device making it possible to eliminate the pulses of more than 80 volts, for example those due to lightning,
- a low-pass filtering circuit 91, 92, linked to the output of the peak-limiting device 93, 94,
- automatic switching means 106, 107 for supplying or not supplying power to the rest of the circuit depending on the presence or absence of voltage at the input, these means being configured in such a way as to give preference to one of the two power supply networks 89, 90 of the aircraft, when they are both available, and a voltage pre-regulation circuit 95, 96, carrying out voltage peak limiting and limiting of the current at the output of the filtering circuit 91, 92.

The card 34 of the primary power supply module 21 further comprises a voltage step-up/regulator circuit 100 connected to the two voltage pre-regulation circuits 95, 96 for applying a voltage of 28 volts to the rest of the circuit for a few tens of seconds, for example 30 seconds, when the input voltage has fallen to a minimum of 12 volts, and a current distribution circuit 98 connected to the output of the voltage step-up/regulator circuit 100. The distribution circuit 98 comprises an energy reserve 104 consisting, for example, of a battery of capacitors, and a set of electronic circuit breakers 101 to 103 which supply a pre-regulated DC voltage at 28 volts to the other modules 22 to 25 of the rack 1, 2.

It should be noted that the energy reserve 104 is arranged at the output of the voltage step-up/regulator circuit. 100 which thus applies a high and substantially constant voltage to it. As the charge on a capacitor is proportional to the voltage applied between its terminals, the energy stored in the energy reserve 104 thus remains substantially constant and high whatever the level of the voltage supplied by the network.

By virtue of these arrangements, the primary power supply module 21 is capable of compensating for breaks of a few tens of milliseconds (20 to 200 ms for example) by maintaining the power supplies to the modules 22 to 25.

The circuit breakers 101 to 103 are designed in such a way as to open automatically in the event of a downstream short-circuit, and to close again automatically when they are switched off. They thus provide separate protection for the primary power supply module 21 against the short-circuits which may occur within the modules 22 to 25 or at the connections between these modules and the circuit breakers, and thus guarantee the availability of the power supply and the non-propagation of the faults, in the event of a short circuit on a module.

The pre-regulation circuits 95, 96 each comprise a blocking diode making it possible to avoid the capacitors 104 being discharged to the networks, in the event of the circuit being cut.

By virtue of the energy reserve 104 and the voltage step-up/regulator device 100, the primary power supply module 21 is capable of compensating for breaks of a few tens of milliseconds, (20 to 200 ms for example) by maintaining the power supplies to the modules 22 to 25.

Moreover, the card 34 of the module 21 further comprises two network cut-off detection devices 108, 109 respectively, connected in parallel between the output of the filters 91, 92 and the output of the voltage step-up/regulator circuit 100. When the duration of the cut-off from the networks exceeds the energy reserve 104 coverage time, the network cut-off detection devices 108, 109 indicate to the modules 22 to 25, using signals 108a and 109a, that there will be a complete loss of power supply within a period approaching a few milliseconds (2 to 20 ms). The appearance of the signals 108a and 109a trigger a process of memory storage, in a memory backed up by battery or capacitor, of certain critical flight parameters. The time for writing to the memory is of the order of 2 to 20 ms, while the time necessary for memory storage of these parameters generally lies between 200 ms and 5 s.

Certain electronic circuit breakers 101 to 103 may also be opened using a signal 99 output by the main network detector 108 upon the loss of the network, and when it is not desired to supply power to one or more modules 22 to 25 with the standby network, so as to avoid too heavy a load on it.

Moreover, the card 34 also comprises a non-volatile maintenance memory 105, of the FPROM type, for example, making it possible to store in memory all the events which are likely to facilitate maintenance of the card, such as the opening of a circuit breaker 101 to 103 and the network cut-offs which have given rise to changes of state of the switches 106, 107. The contents of this memory 105 are updated by the modules 22 to 25 which have read and write access to them in order to verify each write. This memory can also be updated by the cut-off detectors 108, 109, and by the circuit breakers 101 to 103 and the switching devices 106, 107, which, for this purpose, have a binary output giving the state of the circuit breaker or of the switching device respectively.

The card 34 of this primary power supply module 21 supplies the other modules, 22 to 25 of the equipment 1 with a pre-regulated voltage which can then be adapted by the other modules by means of integrated secondary power supply units 41, exhibiting a structure which is much simpler and less bulky, and consequently less expensive than if it had been necessary directly to adapt the voltages supplied by each network of the aircraft to the requirements of each module.

Figure 6:
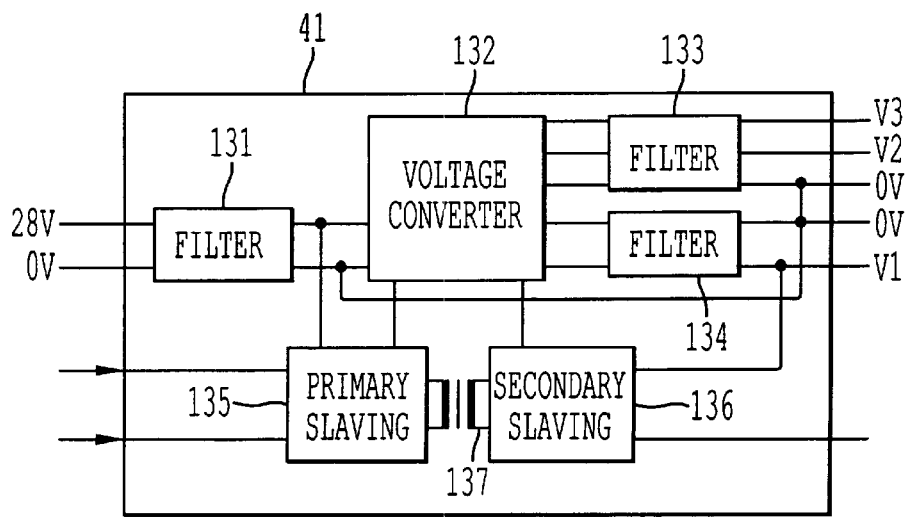
FIG. 6 shows a power supply module according to the invention.

Hence, in FIG. 6, each secondary power supply unit 41 comprises an input filter 131 receiving the pre-regulated voltage of 28 volts, making it possible to eliminate the high frequencies which may appear on the connecting lines between the circuit breakers 101 to 103 and the power supply units 41. The output of the input filter 131 is connected to a DC voltage converter 132 comprising a primary unit and a secondary unit which are isolated electrically by a pulse transformer. The power supply for the modules is thus isolated electrically from the primary power supply module 21. The converter 132 is, for example, of the "flyback" switched-mode type with switching at 0 volts. The secondary unit makes it possible to supply the various voltages V1, V2, V3 which the module needs, for example 5 V and +/−15 V, which are filtered beforehand by output filters 133, 134 making it possible to eliminate the high frequencies which may be introduced by the switched-mode converter 132.

Moreover, the converter 132 is slaved in voltage by a control circuit comprising a primary circuit 135 receiving control signals and a secondary circuit 136, supplying control signals, these two circuits 135, 136 being isolated electrically by a pulse transformer 137. The secondary control circuit 136 takes a measurement of one of the voltages at the output of the filters 133, 134, for example the voltage V1, in order to generate a control signal which is transmitted to the primary circuit 135. The primary circuit 135 converts this signal on the basis of a rated maximum output power, into a second control signal which is applied to the switching 20 transistors of the switched-mode converter 132. The regulation of the other output voltages V2, V3 is obtained by virtue of the magnetic coupling formed by the transformer of the converter 132 and by virtue of the symmetry of its circuits. Such a converter does not need a minimum load on its outputs.

In the event of a fault, the various cards of the modules 21 to 25 can easily be disconnected by simply withdrawing them from the rack into which they are plugged. Any faultfinding is done by connecting an appropriate maintenance tool by means of the connector of the card, this tool being equipped with means for reading and updating the maintenance memory 43, 105 of the module.

As mentioned above, the processing cards 30 of the modules 22 to 24 are identical. However, the tasks performed by each of these various cards may be of very different natures, of variable durations, and, above all, of very different levels of criticality. It is therefore necessary to take specific measures to ensure that these tasks run correctly.

Thus, for example, the module IOP 24 performs the following tasks:

the concentrating, in the processing assembly 1, 2, of the noncritical data originating from the various systems of the aircraft, intended in particular, for the electronic instrumentation system of the instrument panel, the deriving of the parameters and of the control logic output by and intended for redundant functions, the gathering and the formatting of the data intended for the flight recorder, the generating of the alarms intended for the crew and the activation of the visual and audible warning devices, the communication with other equipment, such as the ground proximity warning system (GPWS), and the testing of the system and the locating of unserviceabilities, this latter task having a lower degree of criticality than the others.

In order to prevent one function disturbing another, and, in particular, a less critical function from blocking the execution of a more critical function, the ASIC circuit comprises:

a circuit 77 for managing the inputs/outputs of the processing unit 40, which may be of ARINC digital processing type 429, discrete or serial, a peripherals management circuit 78 comprising means for rapid transfer (DMA) of data between areas addressable by the microprocessor 70, so as to delimit cyclic time slices, and a circuit 79 for control of accesses to the space addressable by the microprocessor 70 on the basis of access rights allocated to the various tasks performed by the processor, these access rights being stored in another non-volatile memory 80 addressed via the bus and the data port of which is linked to the ASIC circuit 73.

The access control circuit 79 comprises means 79 for controlling the schemes of addressing the space addressable by the microprocessor 70, this space comprising the memories 81, 82 and the input and output registers accessible via the input/output management circuit 77.

Moreover, the memory 80 is connected to the high-order bits of the address bus, which makes it possible to associate access rights stored in the memory set, for example of 512 bytes, of the space addressable by the microprocessor.

Figure 7:
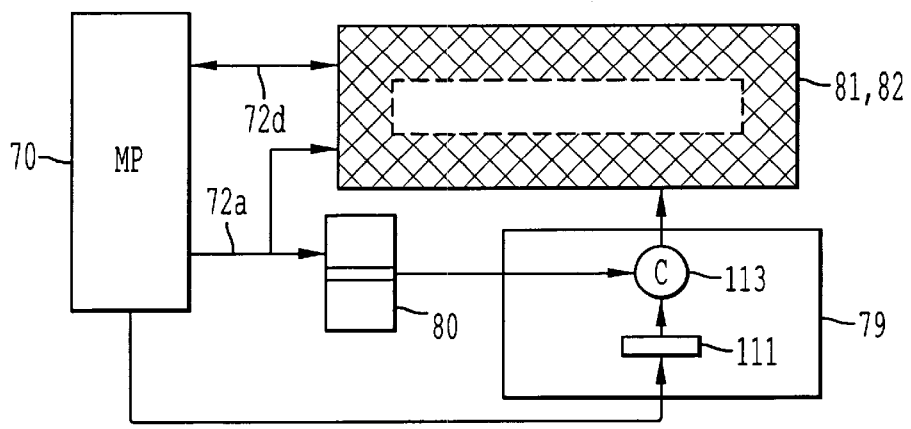
FIG. 7 illustrates the operation of a processing unit.

As represented in FIG. 7, the circuit 79 for control of accesses to the space addressable by the microprocessor 70 comprise a register 111 containing the authorized access rights corresponding to the current cycle time slice, updated by the microprocessor 70 at the start of each new time slice, marked by an interrupt. This circuit is connected to the data bus of the non-volatile memory 80 which contains the rights of access to each area of the space addressable by the microprocessor 70.

Figure 8:
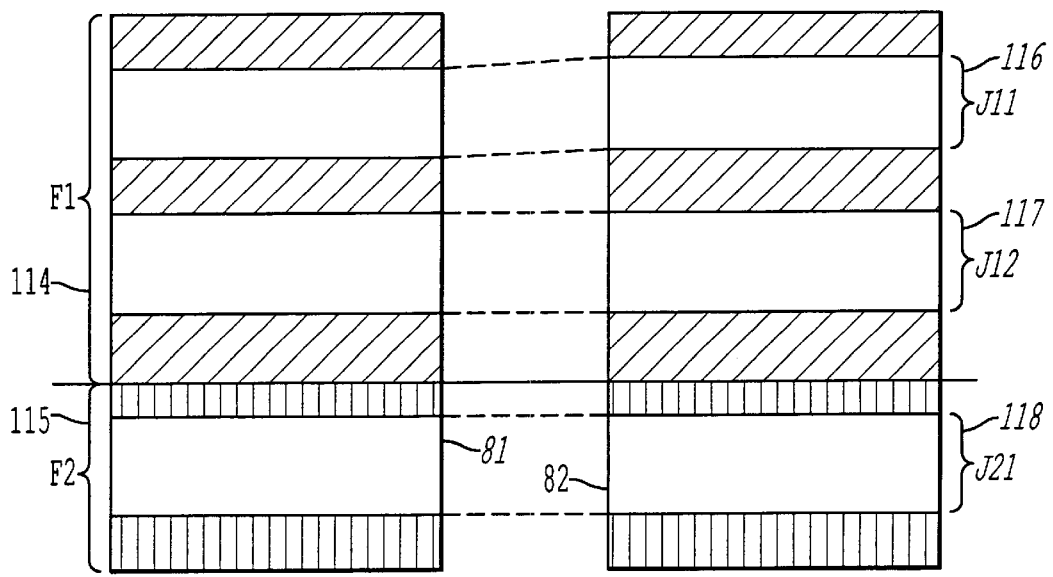
FIG. 8 represents the organization of a part of the memory of a processing unit.

In FIG. 8, the memory containing the programs 81 and the memory containing the data 82 are divided into the partitions 114$p$, 115$p$, 114$d$ and 115$d$, allocated respectively to two separate functions F1, F2, the partitions 114$p$ and 115$p$ containing respectively the program which can be run by the microprocessor 70 allowing the functions F1, F2 to be carried out exclusively, by F1, F2 respectively. As each function comprises several tasks J11, J12 and J21, the partitions 114$p$, 115$p$, 114$d$ and 115$d$ are in their turn divided into several areas containing the program, or, as the case may be, being usable to store data, by a task Jij of the corresponding function Fi.

Hence the space addressable by the microprocessor is structured into partitions and into areas within the same partition, each area being associated with access rights.

Advantageously, the memory areas which can be used by each cyclic task are separated from one another by unused memory areas (shaded areas shown in FIG. 4), which makes it possible to cause certain addressing errors to have no effect on the other functions.

When the microprocessor 70 accesses one of the memories 81, 82, at a given address, the address is sent on the address bus 72$a$ to both the memory area addressed in the space addressable by the microprocessor 70, and to the memory 80 which then supplies the access rights of the addressed area to the monitoring service 79. The monitoring service 79 comprises a comparator 113 which compares the access rights originating from the register 111 with the access rights read from the memory 80.

If the comparator detects a difference, it prohibits the microprocessor 70 from gaining access to the memory area addressed when write access is involved, and generates a memory-access violation interrupt, forwarded to the microprocessor 70. When read access is involved, it simply signals that the reading has taken place in a prohibited area. If the access rights read from the memory 80 and those stored in the register 111 coincide, the data can be exchanged on the data bus 72$d$ between the microprocessor and the memory area.

The access-rights words stored in the memory 80 may each comprise four fields, namely a field 121 corresponding to a level of criticality, a field 122 corresponding to a partition number, a write-protection field 123 and a read-protection field 124.

According to one variant of the invention, the comparator 113 may additionally authorize access to an area corresponding to the same function as that of the current time slice, and the level of access rights of which is lower than that of the current task, this being done so as to set up a hierarchy within the access rights upon running the tasks of a function.

This detection of addressing errors makes it possible to neutralize faults by preventing any erroneous alteration of the memory or erroneous access to an output register, and to halt the running of the task or of the faulty function, depending on the gravity of the fault. In this way, any propagation of the fault to the other functions performed by the microprocessor, and to the other parts of the addressable space, is prevented.

Figure 9:
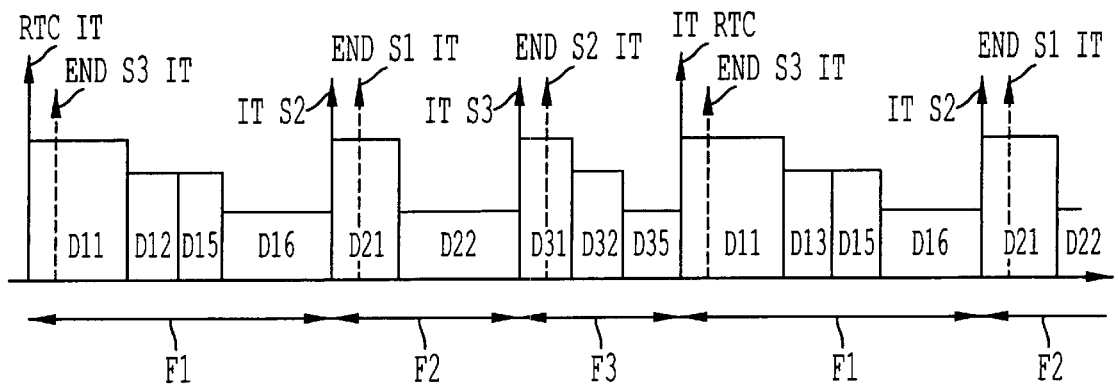
FIG. 9 illustrates the sharing of the use of the processor in terms of cycle time slices.

According to FIG. 9, the method according to the invention makes it possible to run several functions separately using the same processor, these functions each comprising several tasks, the utilization times of the microprocessor 70 being divided into periods by a cyclic interrupt RTC IT produced by a real-time clock of the peripherals management circuit 78, the time interval between two RTC IT interrupts itself being divided into as many time slices as there are functions F1, F2, F3 run by the microprocessor, by interrupts ITS2, ITS3 spaced apart from one another as a function of the time which it is desired to allocate to each function F1, F2, F3, these interrupts also being produced by the management circuit 78.

The function F1 comprises six tasks J11 to J16, the task J11 being run at each RTC IT interrupt marking the start of the partition allocated to F1, the tasks J12, J13 and J14 (not represented) being run alternately following task J11, task J15 being run at each partition allocated to F1 following one of the tasks J12, J13, J14, the task J16 being run as a background task in the time remaining to the partition allocated to F1. Likewise, the function F2 comprises two tasks J21 and J22, the task J21 being run at each interrupt ITS2 marking the start of the partition allocated to F2, and the task J22 being run as a background task in the time remaining to the partition allocated to F2. The function F3 comprises 5 tasks, namely the task J31 run following each ITS3 interrupt, the task J32, and the tasks J33 and J34 (not represented), run alternately following the task J31, and the task J35 run as a background task in the time remaining in the partition allocated to F3.

The RTC IT interrupts, ITS2 and ITS3, can be masked, that is to say that they are postponed in the event that the microprocessor is running a sequence of code which should not be interrupted. In order to prevent an error occurring during such a sequence of code from disturbing the running of the other functions, a non-maskable interrupt EndS3 IT, EndS1 IT, EndS2 IT, is generated by the peripherals management circuit 78 just after the normal end of the corresponding time slice, this interrupt being systematically disabled by the microprocessor 70 when all the tasks of each cycle have been run.

In this way, in normal operation this interrupt does not appear, but if the performance of a function F1, F2, F3 for a given cycle exceeds the duration of the cycle this interrupt appears, which makes it possible, in this case, to avoid the activation of the function at the following cycle from being delayed.

The microprocessor 70 has access to a table stored in memory 81 describing the scheduling of the tasks at each cycle delimited by the RTC IT interrupts, ITS2 and ITS3, and the access rights allocated to each task. Upon starting up each task, the microprocessor updates the register 111 with the access rights allocated to the task in this table.

Moreover, provision can be made to allocate in this table a minimum time and a maximum time for the running of each task. The processor can then gain access to a time counter included in the peripherals management circuit 78 at the start and at the end of each task and can check that the running time thus measured lies between the minimum and maximum times. If that is not the case, it then calls a software error manager to handle the error and, if appropriate, halt the subsequent running of the task or of the function in question so as to neutralize the effects of the error.

In order further to increase the operating safety afforded by the structuring of the space addressable by the microprocessor, the unused areas of the memories 81, 82 can be filled with executable code by the microprocessor 70 which, if it happened to be fun by the microprocessor, would, for example, cause it to stop or be locked up, and thus cause the maximum time attributed to the task to be exceeded.

Figure 10:
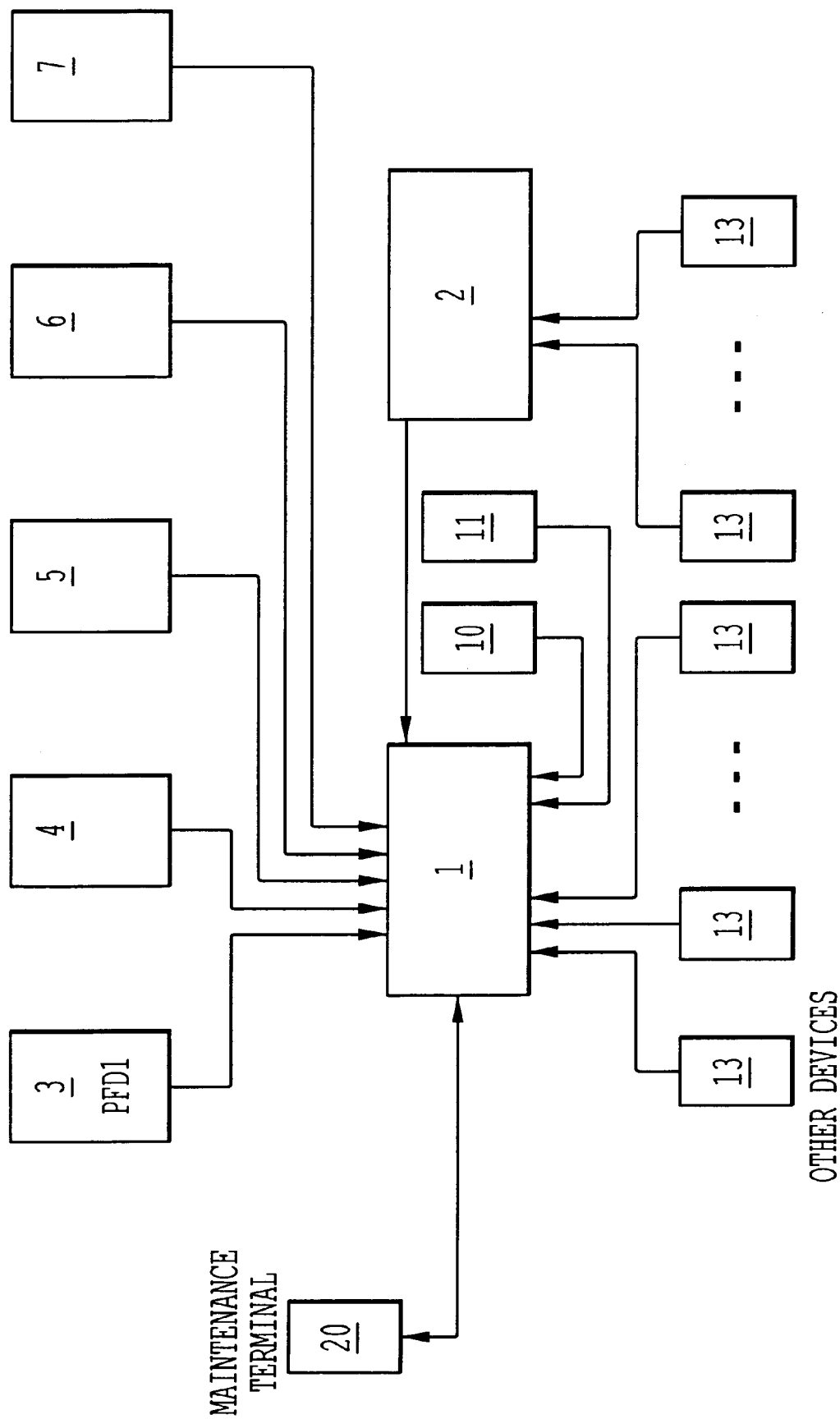
FIG. 10 illustrates the organization of the maintenance of the various elements of the architecture represented in FIG. 1.

FIG. 10 shows the organization of the maintenance of the various elements of the electronic equipment for industrial process control shown diagrammatically in FIG. 1. The various critical visual-display devices 3 to 7, the receptacle of the processing assembly 2, the engine-parameter measuring devices 10, 11 and the peripheral equipment 13 generating noncritical data are linked by maintenance buses to the receptacle of the processing assembly 1 which encloses a maintenance unit linked by a communications bus to a maintenance terminal 20 including a device for visually displaying the operating status of the various elements of the electronic control equipment and a recording device, for the purposes of subsequent interpretation.

What is claimed is:

1. A modular architecture of items of electronic equipment for a control of an industrial process, comprising:
   receptacles containing data-concentration modules and processing modules supplied with energy by power supply modules;
   critical display devices; and
   data transmission means for interconnecting the receptacles and the critical display devices to critical sensors, noncritical sensors and actuators,
   wherein the critical sensors transmit their critical information directly to the critical display devices and to the data-concentration and processing modules of the receptacles, the data-concentration modules, on the basis of data from the critical and noncritical sensors, deriving noncritical data intended for the critical display devices and for the processing modules via a multi-receiver serial digital bus, the processing modules deriving commands intended for the actuators on the basis of the data from the critical sensors and of noncritical data output by the concentration modules.

2. The modular architecture of items of electronic equipment according to claim 1, further comprising:
   a maintenance unit arranged in a first one of the receptacles and linked to a second one of the receptacles, to the critical display devices, to an engine-parameter measuring device and to the noncritical sensors by maintenance buses; and
   a maintenance terminal linked to the maintenance unit by a communications bus.

3. The modular architecture of items of electronic equipment according to claim 1, wherein the critical display devices comprise processing means for interpreting and visually displaying the data which are transmitted to the critical display devices originating from the critical and noncritical sensors.

4. The modular architecture of items of electronic equipment according to claim 3, wherein each processing and data-concentration module comprises an identical processing card, equipped with a processor, and an input/output card providing a connection between the processing card and direct inputs and outputs of a respective module, the processing card comprising a memory into which is loaded a program making it possible to control the processor so as to perform a function of the respective module.

5. The modular architecture of items of electronic equipment according to claim 3, wherein the processing and data-concentration modules are brought together in a rack comprising a primary power supply module performing pre-regulation of primary voltages supplying the rack and exhibiting a wide range of variation, to supply pre-regulated primary voltages exhibiting a small range of variation, each processing and data-concentration module of the rack including a DC voltage converter device receiving the pre-regulated primary voltages and supplying a respective module with the voltages which the respective module needs.

6. The modular architecture of items of electronic equipment according to claim 1, wherein each processing and data-concentration module comprises an identical processing card, equipped with processor, and an input/output card providing a connection between the processing card and direct input and outputs of a respective module, the processing card comprising a memory into which is loaded a program making it possible to control the processor so as to perform a function of the respective module.

7. The modular architecture of items of electronic equipment according to claim 6, wherein each processing and data-concentration module comprises a non-volatile maintenance memory in which are stored results of self-tests and all events assisting with maintenance of a respective module.

8. The modular architecture of items of electronic equipment according to claim 6, wherein each processing card includes a device comprising:
  means for dividing a space addressable by the processor into addressable partitions and into addressable areas, and for attributing to each function and each task performed by the processor at least one addressable partition and at least one addressable area respectively,
  means for dividing a utilization time of the processor into cyclic time slices, and for allocating the cyclic time slices respectively to a running of each of the functions,
  means for successively activating the tasks of each function, in a pre-defined order, during the cyclic time slices allocated to a respective function,
  means for updating and storing access rights corresponding to a task being performed, and
  means for checking, upon each access to an addressable area, that access rights attributed to the task being performed correspond to the access rights of an area addressed.

9. The modular architecture of items of electronic equipment according to claim 6, wherein a first and second part of the memory which can be used by each task performed by the processor are separated by unused areas.

10. The modular architecture of items of electronic equipment according to claim 9, wherein the unused areas of the program and data memory are filled with code which can be executed by the processor allowing a memory-access error to be signaled, by stopping or blocking of the processor.

11. The modular architecture of items of electronic equipment according to claim 6, wherein each processing card stores in memory a same operating software comprising functions of initialization and self-test of a corresponding processing card, the functions of real-time management of a multi-task system, and a library of functions common to all the processing modules.

12. The modular architecture of items of electronic equipment according to claim 6, wherein the processing and data-concentration modules are brought together in a rack comprising a primary power supply module performing pre-regulation of primary voltages supplying the rack and exhibiting a wide range of variation, to supply pre-regulated primary voltages exhibiting a small range of variation, each processing and data-concentration module of the rack including a DC voltage converter device receiving the preregulated primary voltages and supplying a respective module with the voltages which the respective module needs.

13. The modular architecture of items of electronic equipment according to claim 1, wherein the processing and data-concentration modules are brought together in a rack comprising a primary power supply module performing pre-regulation of primary voltages supplying the rack and exhibiting a wide range of variation, to supply pre-regulated primary voltages exhibiting a small range of variation, each processing and data-concentration module of the rack including a DC voltage converter device receiving the pre-regulated primary voltages and supplying a respective module with the voltages which the respective module needs.

14. The modular architecture of items of electronic equipment according to claim 13, wherein the primary power supply module comprises means for filtering and clipping of overvoltages, and means for compensating for short-duration voltage drops, which are connected to an energy reserve.

15. The modular architecture of items of electronic equipment according to claim 14, wherein each processing and data-concentration module comprises a non-volatile maintenance memory in which are stored results of self-tests and all events assisting with maintenance of a respective module.

16. The modular architecture of items of electronic equipment according to claim 14, wherein the primary power supply module comprises one electronic circuit breaker for protection against short-circuits per module to be supplied to the rack, the electronic circuit breaker being connected to the DC voltage converter device of the module of the rack to supply the DC voltage converter device with one of the pre-regulated primary voltages.

17. The modular architecture of items of electronic equipment according to claim 13, wherein each processing and data-concentration module comprises a non-volatile maintenance memory in which are stored results of self-tests and all events assisting with maintenance of a respective module.

18. The modular architecture of items of electronic equipment according to claim 13, wherein the primary power supply module comprises one electronic circuit breaker for protection against short-circuits per module to be supplied of the rack, the electronic circuit breaker being connected to the DC voltage converter device of the module of the rack to supply the DC voltage converter device with one of the pre-regulated primary voltages.

19. The modular architecture of items of electronic equipment according to claim 18, wherein each processing and data-concentration module comprises a non-volatile maintenance memory in which are stored results of self-tests and all events assisting with maintenance of a respective module.

20. The modular architecture of items of electronic equipment according to claim 13, wherein each processing card includes a device comprising:
  means for dividing a space addressable by the processor into addressable partitions and into addressable areas, and for attributing to each function and each task performed by the processor at least one addressable partition and at least one addressable area respectively,
  means for dividing a utilization time of the processor into cyclic time slices, and for allocating the cyclic time slices respectively to a running of each of the functions,
  means for successively activating the tasks of each function, in a pre-defined order, during the cyclic time slices allocated to a respective function,
  means for updating and storing access rights corresponding to a task being performed, and
  means for checking, upon each access to an addressable area, that access rights attributed to the task being performed correspond to the access rights of an area addressed.

21. A modular architecture of items of electronic equipment for a control of an industrial process, comprising:
  receptacles containing data-concentration modules and processing modules supplied with energy by power supply modules;

critical display devices; and a data transmission unit configured to interconnect the receptacles and the critical display devices to critical sensors, noncritical sensors and actuators, wherein the critical sensors transmit their critical information directly to the critical display devices and to the data-concentration and processing modules of the receptacles, the data-concentration modules, on the basis of data from the critical and noncritical sensors, deriving noncritical data intended for the critical display devices and for the processing modules via a multi-receiver serial digital bus, the processing modules deriving commands intended for the actuators on the basis of the data from the critical sensors and of noncritical data output by the concentration modules.

22. The modular architecture of items of electronic equipment according to claim 21, wherein the display devices comprise a processor configured to interpret and visually display the data which are transmitted to the critical display devices originating from the critical and noncritical sensors.

23. The modular architecture of items of electronic equipment according to claim 21, further comprising:

a maintenance unit arranged in a first one of the receptacles and linked to a second one of the receptacles, to the critical display devices, to an engine-parameter measuring device and to the noncritical sensors by maintenance buses; and a maintenance terminal linked to the maintenance unit by a communications bus.

24. The modular architecture of items of electronic equipment according to claim 21, wherein the processing and data-concentration modules are brought together in a rack comprising a primary power supply module performing pre-regulation of primary voltages supplying the rack and exhibiting a wide range of variation, to supply pre-regulated primary voltages exhibiting a small range of variation, each processing and data-concentration module of the rack including a DC voltage converter device receiving the pre-regulated primary voltages and supplying a respective module with the voltages which the respective module needs.

25. The modular architecture of items of electronic equipment according to claim 24, wherein the primary power supply module comprises a filter configured to filter and clip overvoltages, and a unit configured to compensate for short-duration voltage drops, which are connected to an energy reserve.

26. The modular architecture of items of electronic equipment according to claim 24, wherein the primary power supply module comprises one electronic circuit breaker for protection against short-circuits per module to be supplied of the rack, the electronic circuit breaker being connected to the DC voltage converter device of the module of the rack to supply the DC voltage converter device with one of the pre-regulated primary voltages.

27. The modular architecture of items of electronic equipment according to claim 21, wherein each processing and data-concentration module comprises an identical processing card, equipped with a processor, and an input/output card providing a connection between the processing card and direct inputs and outputs of a respective module, the processing card comprising a memory into which is loaded a program making it possible to control the processor so as to perform a function of the respective module.

28. The modular architecture of items of electronic equipment according to claim 27, wherein each processing card includes a device comprising:

a first divider configured to divide a space addressable by the processor into addressable partitions and into addressable areas, and to attribute to each function and each task performed by the processor at least one addressable partition and at least one addressable area respectively, a second divider configured to divide a utilization time of the processor into cyclic time slices, and for allocating the cyclic time slices respectively to a running of each of the functions, an activation unit configured to successively activate the tasks of each function, in a pre-defined order, during the cyclic time slices allocated to a respective function, and an updating unit configured to update and store access rights corresponding to a task being performed, and a unit configured to check upon each access to an addressable area, that access rights attributed to the task being performed correspond to access rights of an area addressed.

29. The modular architecture of items of electronic equipment according to claim 27, wherein a first and second part of the memory which can be used by each task performed by the processor are separated by unused areas.

30. The modular architecture of items of electronic equipment according to claim 29, wherein unused areas of the program and data memory are filled with code which can be executed by the processor allowing a memory-access error to be signaled, by stopping or blocking of the processor.

31. The modular architecture of items of electronic equipment according to claim 27, wherein each processing card stores in memory a same operating software comprising functions of initialization and self-test of a corresponding processing card, functions of real-time management of a multi-task system, and a library of functions common to all the processing modules.

32. The modular architecture of items of electronic equipment according to claim 27, wherein each processing and data-concentration module comprises a non-volatile maintenance memory in which are stored results of self-tests and all events assisting with maintenance of a respective module.

* * * * *